April 9, 1946. H. D. SHAW 2,398,051
LEAKAGE TESTING APPARATUS FOR HIGH PRESSURE CONTAINERS
Filed Oct. 12, 1944
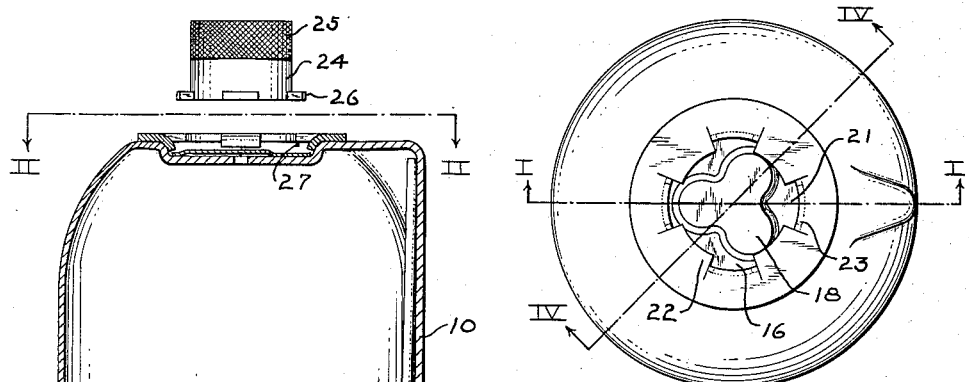
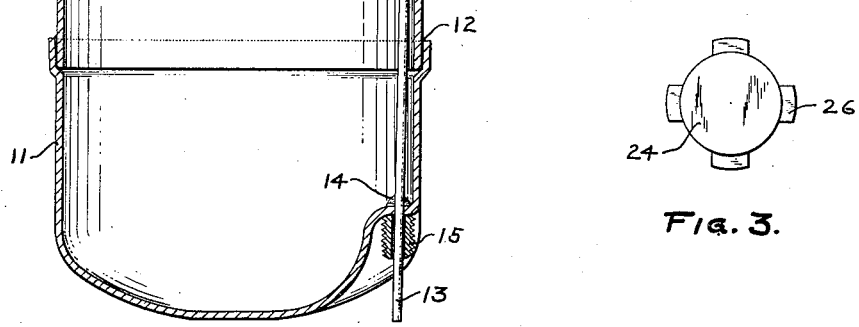
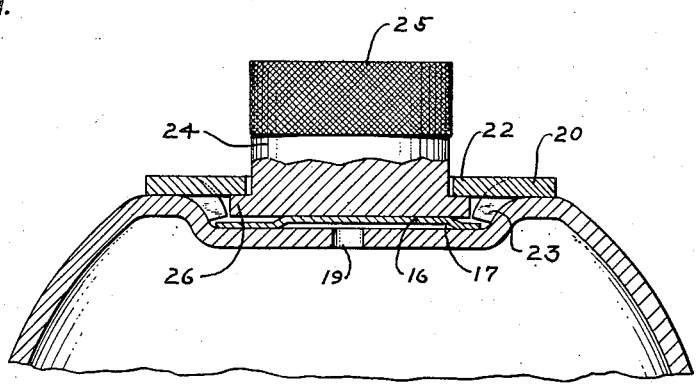
WITNESSES:
William F. Livezey
Vincent W. Novak
INVENTOR
HAROLD D. SHAW
BY
ATTORNEY Patented Apr. 9, 1946

2,398,051

UNITED STATES PATENT OFFICE 2,398,051

LEAKAGE TESTING APPARATUS FOR HIGH-PRESSURE CONTAINERS

Harold D. Shaw, Longmeadow, Mass., assignor to Westinghouse Electric Corporation, East Pittsburgh, Pa., a corporation of Pennsylvania Application October 12, 1944, Serial No. 558,437

2 Claims. (Cl. 220—87)

This invention relates to the testing of pressure containers and particularly to the testing of such containers as are equipped with a pressure relief device designed to rupture at less pressure than the walls of the container.

It is desirable, and often required by regulations, that containers adapted to contain fluid under pressure, such as liquefied gas, be tested under internal pressures greater than those which prevail when the container is charged with the fluid it is designed to carry, so that a margin of safety may be afforded by the container construction.

It is also desirable that such containers be provided with a pressure relief device, for example, a frangible membrane, which yields at less pressure than do the walls of the container, when the pressure within the container exceeds any given amount.

In the type of container herein described, it is highly desirable that the container and the frangible membrane be assembled in a single operation prior to the testing thereof. However, the test pressure, depending on the nature of the fluid normally carried in the container, may exceed that at which the frangible membrane is designed to rupture. It thus becomes necessary to protect the membrane against rupture or deformation during the testing operation.

An object of the invention, therefore, is to provide a means for protecting a frangible membrane associated with a pressure container against rupture when the container is being subjected to test pressure.

A further object is to provide such a protective means, which means is associated with the container only during the test period, and which may be readily detached from the container when the container is not being tested.

These and other objects are effected by the invention as will be apparent from the following description and claims taken in connection with the accompanying drawing, forming a part of this application, in which:

Fig. 1 is a vertical section through a pressure container supplied with a pressure relief membrane, taken on line I—I of Fig. 2. This figure also shows at its top a protective plug ready to be associated with the container;

Fig. 2 is a plan view of the container taken on line II—II of Fig. 1;

Fig. 3 is a plan view looking down on the top of the test plug; and

Fig. 4 is an enlarged sectional view taken on line IV—IV of Fig. 2, of the portion of the container carrying the frangible membrane, showing the test plug in position for the testing operation.

The container and frangible membrane assembly here shown is the same as that described in the copending application of Elliott E. Grover, Serial No. 492,803, filed June 30, 1943, for Safety device.

The container comprises two bell-shaped members 10 and 11 brazed together at their nested open ends, as indicated at 12, to form a closed container. A capillary discharge tube 13 extends interiorly of the container from a point near the end wall of member 10 through and beyond the end wall of member 11 to which it is brazed, as indicated at 14. The tube provides a means through which the container can be tested under pressure and through which the contents of the container can be charged and discharged. In practice, after the container has been tested and charged, the end of the tube is sealed as by crimping its end. When the contents are to be discharged, the end of the tube is broken off by flexing or cutting. It may be noted that the projecting end of the tube extends through a threaded nipple 15, also brazed to the container and which receives a temporary sealing cap (not shown) in the event the contents of the container are not to be discharged at one time.

The frangible membrane 16 is disposed in a depression 17 formed in the end wall of member 10. This membrane, as fully described in the Grover application referred to, is a thin metal disc having a clover-shaped embossing 18 pressed thereon. The periphery of the disc is brazed in fluid-tight relation with the wall of the container. It may be noted that all the brazing operations herein referred to occur simultaneously with the passage of the assembly through a suitable furnace. A port 19 in the depressed portion 17 of the end wall of member 10 affords communication between the interior of the container and the underside of membrane 16.

While for the purpose of description, the particular membrane here shown is that described in the aforesaid Grover application, it is obvious that the invention is equally applicable to any type of frangible membrane.

The particular container herein described ruptures at about 1800 pounds per square inch and the frangible membrane at from 500 to 750 pounds per square inch, whereas the test pressure prior to charging is established by regulation at 600 pounds per square inch. This is, of course, a particular set of conditions for a particular fluid and is to be considered as an example and not a limiting factor in the invention.

It is apparent that under such conditions, if the container is to be tested with the frangible membrane in place and brazed to the container, provision must be made for protecting the membrane against distortion or rupture during the testing operation. To this end I provide a strong rigid washer-like member 20 having a cruciform aperture 21, which member is brazed to the end of the container above the frangible membrane 16. Initially, the member has the usual circular aperture, but before being brazed to the container, it is stamped to the cruciform shape shown in the drawing, leaving four equally-spaced horizontal flanges 22 projecting toward the center of the member and providing four equally-spaced downturned portions 23 which serve to center the member 20 on the curved edges of the depression 17 formed in the end wall of the member 10.

A cylindrical test plug 24 is provided with a knurled upper end 25 for easy handling and its lower end carries four equally-spaced flanges 26. The flanges are of sufficient length horizontally to fit well under the horizontal flanges 22 of member 20 and are of sufficient thickness to fill the space between the frangible membrane 16 and the underside of horizontal flanges 22. Their width is such that they will easily drop into the space formed by the turned-down portion 23 between each two adjoining horizontal flanges 22. The diameter of plug 24 is, of course, less than the space between the inward edges of flanges 22. A burr or depending portion 27 may be provided on one or more flanges 22 to limit rotation of the plug when it is inserted to test position.

The operation is believed obvious. When a container is to be tested, a plug 24 is inserted by dropping the flanges 26 into the space between adjoining horizontal flanges 22 and rotating the plug until flanges 26 are beneath the flanges 22, the burr 27 limiting the rotation of the plug. Thus, when test pressure is applied in excess of that at which the membrane 16 ruptures or distorts, the cooperating flanges 22, 26 assume enough of the test load to prevent such rupture or distortion. At the end of the test, the plug is removed.

While the washer-like member and plug have been described as having four flanges, it is apparent that more or less may be provided as conditions may require.

While the invention has been shown in but one form, it will be obvious to those skilled in the art that it is not so limited, but is susceptible of various changes and modifications without departing from the spirit thereof.

What is claimed is:

1. In combination, a closed container for fluid under pressure, a frangible membrane associated with said container and exposed to the pressure therein, said membrane being distortable and rupturable at less pressure than the walls of the container, and means associated with the container and bearing against the membrane for preventing distortion or rupture thereof when the container is subjected to pressure sufficient to cause said rupture or distortion, said means comprising a removable flanged plug and a flanged washer-like member permanently attached to the container, the flanges on said washer-like member being spaced above the frangible membrane a distance sufficient to permit insertion of the flanges on the plug snugly between the flanges on the washer-like member and said frangible membrane.

2. In combination, a closed container for fluid under pressure, a frangible membrane associated with said container and exposed to the pressure therein, said membrane being distortable or rupturable at less pressure than the walls of the container, said membrane being entirely disposed in a depression formed in a wall of the container, a washer-like member attached to the container adjacent to but spaced from the membrane, said washer-like member being provided with horizontal flanges and a recess for the reception of a flanged plug which bears against the frangible membrane to prevent distortion or rupture thereof when the container is subjected to pressure sufficient to cause said rupture or distortion.

HAROLD D. SHAW.